UNITED STATES PATENT OFFICE 2,030,048

PRODUCTION OF OXYGENATED ORGANIC COMPOUNDS

Ralph Lyman Brown, Syracuse, N. Y., assignor to Atmospheric Nitrogen Corporation, New York, N. Y., a corporation of New York No Drawing. Application June 20, 1931, Serial No. 545,847

10 Claims. (Cl. 260—116)

This invention relates to the production of oxygenated organic compounds, more particularly to a synthetic process for the preparation of acetic acid and derivatives thereof and catalytic agents for use in the process.

The attempts which have heretofore been made to prepare oxygenated organic compounds catalytically, more particularly acetic acid, have been unsatisfactory in that undesirable side reactions were either induced or permitted; workable industrial activity was associated with a short life of the catalyst, or, in the event that the catalyst possessed a reasonable life, the activity thereof was too low for commercial purposes. The result accordingly was that under conditions in which yields were obtained which were looked upon as commercially and economically feasible, the life of the catalyst was too short to permit of its utilization.

Attempts have been made to use phosphoric acid as a catalyst for the synthetic production of acetic acid from carbon monoxide and methanol either by bubbling the reactants through the phosphoric acid or by passing them through a tower counter-current to a stream of phosphoric acid. These attempts were likewise unsatisfactory in that the undesirable side or secondary reactions were excessive or were not susceptible to the control necessary for economic operation. This mode of operation further entailed the economic disadvantage of requiring a large amount of phosphoric acid per unit of acetic acid produced.

I have found that the reactions and related equilibria involved in the synthesis of acetic acid from carbon monoxide and methanol may be utilized and the side reactions which have heretofore been limiting factors can be so controlled that acetic acid may be produced in a manner which gives high yields and which is capable of substantially continuous operation. This has been accomplished by the development of a novel catalytic agent and combination of operative conditions.

In the practice of the invention oxygenated organic compounds, especially acetic acid and its derivatives, may be produced by passing a gas-containing carbon monoxide and an alcohol, in the case of acetic acid, methanol, over a catalyst comprising silica and phosphoric acid under controlled conditions of temperature, pressure, space velocity and gas composition. The carbon monoxide may be employed as practically pure carbon monoxide or it may be obtained from gases consisting substantially of carbon monoxide and hydrogen which may be prepared from natural gas, artificial gas or other source of carbon by interaction thereof with steam, or the source may be mixtures of gases containing carbon monoxide and hydrogen which arise as by-products in various industrial processes.

The reaction is desirably carried out at an elevated temperature above 350° C. at a pressure greater than 100 atmospheres, with a space velocity of at least 3000, and a carbon monoxide-methanol ratio of about 2 to 10 mol. carbon monoxide to 1 mol. methanol. The proper and careful control of the factors of the reaction above outlined permits good yields of acetic acid.

As an illustrative embodiment of a manner in which the invention may be carried out in practice, the following examples are presented:

*Example I.*—Pure silica, silicic acid or silica gel and ortho phosphoric acid in the proper stoichiometric proportions corresponding to silicyl meta phosphate of the formula $SiO(PO_3)_2$ are brought together by adding silica slowly and with constant stirring to the acid. The mixture is heated at a temperature of about 260° C. for five to eight hours until the mass becomes semi-solid, and is then further heated for several hours at a temperature of about 500° C. The resulting solid material is crushed and screened to size. A satisfactory size has been found to be 6–8 mesh. The catalyst so prepared is in condition for utilization in the synthesis of oxygenated organic compounds, for example, acetic acid.

*Example II.*—4 mol. weights (270 cc. of 85% $H_3PO_4$) of phosphoric acid are slowly added under thorough stirring to 1 mol. weight of $Na_2SiO_3$ in the form of 286 grams of commonly called water glass solution of approximately 40% strength. The resultant mixture is dehydrated by heating for about 4 hours. Active boiling occurs during this treatment and the temperature of the mass rises to about 260° C. At this temperature the mass assumes a viscous doughy consistency. It is then placed in an oven maintained at about 500° C. for about 15–18 hours when it changes to a hard and porous mass. The mass after crushing and screening as in Example I is ready for use.

*Example III.*—269 grams C. P. silicic acid containing about 55% $SiO_2$ by weight are added slowly and with good stirring to 270 cc. 85% ortho phosphoric acid. The resulting mixture is then treated as in Example II.

*Example IV.*—A mixture of 60.4 grams silica gel, 2 gram molecular weights ortho phosphoric acid and 1.22 gram molecular weights meta phosphoric acid (finely ground) is dehydrated by heating slowly to about 500° C. and maintaining this temperature for about 20 hours. The mass, after cooling, is crushed and screened as in Example II.

*Example V.*—Pure silica and oxide of zirconium ($ZrO_2$) finely ground are mixed in equimolar proportions and the mixture added to and intimately mixed with ortho phosphoric acid in the proportion of two mol. weights of the acid to .5 mol. weight of $SiO_2$ and .5 mol. weight $ZrO_2$. The resultant mixture is then dehydrated at a temperature up to about 260° C. and finally at 600–650° C. for about 9 hours, then crushed and screened as described in Example II.

*Example VI.*—A silica-phosphoric acid catalyst prepared, for example, as described in Example I, is placed in a silver-lined converter capable of withstanding high pressures and provided with the usual accessories for high pressure synthesis. The catalyst is then heated to a temperature of from 350–450° C., and under a pressure of from 100–300 atmospheres a mixture containing carbon monoxide and methanol in the molecular proportion of 3 to 7 carbon monoxide to 1 methanol is passed over the catalyst at a space velocity of from 3,000–10,000, preferably from 3,000–7,000. The gaseous mixture passing from the converter is condensed in a suitable condenser and the liquid mixture which contains acetic acid, water, methyl acetate and methanol may be subsequently rectified by extraction and/or distillation to obtain the acetic acid, methyl acetate and methanol. The methanol may be returned to the process and the methyl acetate may be utilized as such or may be hydrolyzed to form acetic acid and methanol, thus increasing the yield of acetic acid and giving additional methanol for return to the operation. The uncondensed exit gas contains unused carbon monoxide and a certain amount of dimethyl ether, among others. The dimethyl ether may be recovered in condensers by suitably cooling or may be returned to the process with the residual gas after proper adjustment of the methanol, water vapor and carbon monoxide inputs by fresh quantities thereof to maintain the proper ratio. When the residual gas is returned to the system thus operating a cyclic system, a certain portion of the residual gas is bled from the system to prevent excessive accumulation of inert constituents, particularly methane.

Preferably water and phosphoric acid in small but controlled amounts are introduced into the catalyst reacting zone together with the methanol and CO gases as more fully described and claimed in co-pending applications, Serial Nos. 545,848 and 545,849. Suitable proportions of water and phosphoric acid are 0.3–0.8 mol. water and 0.005–0.03 mol. phosphoric acid per mol. of methanol.

Carbonaceous matter gradually accumulates on the catalyst surface and the operation preferably includes a reactivation or regeneration step as more fully described and claimed in co-pending application, Serial No. 545,858. This is effected by temporarily interrupting the synthesis and passing air or other oxygen containing gas at atmospheric pressure through the catalyst vessel under temperature conditions of about 500–650° C.

By use of the herein described catalyst, only about 5% of the original methanol is used up in undesired side reactions, i. e., reactions other than the formation of free acetic acid, its methyl ester or methyl ether. Furthermore, since the main side reaction is the formation of methane—a gas—the acetic acid condensate from the process contains a relatively small amount of side reaction products and the acetic acid may be recovered therefrom readily and in a high degree of purity.

Just how or why my special form of phosphoric catalyst functions in such a superior manner is subject to various explanations, none of which, however, is necessarily correct and my invention does not depend thereon. It appears, however, that the silica does not function merely as an inert carrier for the phosphoric acid in the sense of coke and graphite heretofore proposed. In the case of the latter the extent of side reactions and carbon deposition is excessive and, furthermore, the carrier is soon depleted of its phosphoric acid content. I explain in part the efficiency of my catalyst as due to some form of combination between the phosphoric acid and the silica. This combination while sufficiently stable to maintain the acid content of the catalyst, does not prevent the acid from exercising its acetic acid synthesizing action. The silica-phosphoric acid combination (which may be considered as silicyl meta phosphate) may undergo intermediate or temporary hydrolysis by reaction with water vapor formed as a side reaction or present initially in the reacting gases, thereby giving phosphoric acid although the meta phosphate as such contains no free hydroxyl group.

The term "space velocity" as herein used designates the volume of non-condensable gas measured at room temperature and atmospheric pressure introduced into the converter per hour per unit volume of the catalyst as charged.

The production of acetic acid may also be carried out by utilizing carbon monoxide and hydrogen as the starting material, by passing a mixture thereof over a non-homogeneous or dual catalyst. This may be accomplished by passing a mixture containing carbon monoxide and hydrogen, at an elevated temperature and pressure, through a single converter containing a two-layer catalyst bed. The gases first contact with a suitable methanol catalyst whereby methanol is formed, and then with the silica-phosphoric acid catalyst, whereby carbon monoxide and methanol react to form acetic acid. The two layers of the catalyst may be separated by any suitable means as, for example, by means of silver turnings. The acetic acid produced may be separated from the reaction mixture by condensation, and subsequently obtained from the condensate by distillation as before.

The catalyst may be formed in situ in the converter by introducing phosphoric acid together with the carbon monoxide methanol gas into the converter containing a suitably porous form of silica.

When in the claims reference is made to "acetic acid" it is intended to include such derivatives of the free acid as the methyl ester or methyl ether since they are a source, as such or upon further catalytic treatment, of the acid.

I claim:

1. A process for the synthesis of oxygenated organic compounds which comprises reacting a gas containing carbon monoxide with an alcohol in the presence of a silica-phosphoric acid catalyst.

2. A process for the synthesis of oxygenated organic compounds which comprises reacting a gas containing carbon monoxide with an alcohol in the presence of a compound of silica and phosphoric acid as a catalyst.

3. A process for the synthesis of acetic acid which comprises reacting a gas containing carbon monoxide with methanol in the presence of a silica-phosphoric acid catalyst.

4. A process for the synthesis of acetic acid which comprises reacting a gas containing carbon monoxide at an elevated temperature and at a pressure above atmospheric with methanol in the presence of a compound of silica and phosphoric acid as a catalyst.

5. A process for the synthesis of acetic acid which comprises reacting a gas containing carbon monoxide with methanol in the presence of a silica-meta phosphoric acid catalyst at an elevated temperature and at a pressure above atmospheric.

6. A process for the synthesis of acetic acid which comprises reacting a gas containing carbon monoxide with methanol in the presence of a silica-phosphoric acid catalyst at a temperature of 350–450° C., and at a pressure of 100–300 atmospheres.

7. A process for the synthesis of acetic acid which comprises reacting carbon monoxide and methanol in the presence of a catalyst formed by heating a mixture of silica and phosphoric acid.

8. A process for the synthesis of acetic acid which comprises reacting carbon monoxide and methanol in the presence of a catalyst formed by heating silica and phosphoric acid under conditions adapted for formation of silicyl meta phosphate.

9. A process for the synthesis of acetic acid which comprises reacting carbon monoxide and methanol in the presence of a catalyst formed by heating a mixture of silica and ortho phosphoric acid under temperature conditions sufficient to convert the ortho phosphoric to meta phosphoric and adapted for formation of silicyl meta phosphate.

10. A process for acetic acid synthesis from methanol and carbon monoxide which comprises reacting said methanol and carbon monoxide in the presence of hard agglomerates of a silica phosphoric acid material formed by heating an aqueous mixture of silica and phosphoric acid at temperatures of about 260° C. to 650° C. to dehydrate the mixture and form said agglomerates.

RALPH LYMAN BROWN.